United States Patent
Matsuo et al.

(10) Patent No.: US 7,358,739 B2
(45) Date of Patent: Apr. 15, 2008

(54) GEO-STORM GENERATION APPARATUS AND INTERNAL EXPLORATION APPARATUS USING THE GEO-STORM GENERATION APPARATUS

(76) Inventors: Tomoo Matsuo, 4-3-5, Jindaijikita-machi, Chofu-shi, Tokyo 182-0011 (JP); Ayako Ishikawa, 5-28-25, Shakujiidai, Nerima-ku, Tokyo 177-0045 (JP); Kohichi Matsuo, 1-28-40, Shibasaki, Chofu-shi, Tokyo (JP) 182-0014; Akira Ishikawa, 5-28-25, Shakujiidai, Nerima-ku, Tokyo 177-0045 (JP)

( * ) Notice: Subject to any disclaimer, the term of this patent is extended or adjusted under 35 U.S.C. 154(b) by 127 days.

(21) Appl. No.: 11/385,584

(22) Filed: Mar. 20, 2006

(65) Prior Publication Data

US 2006/0214665 A1    Sep. 28, 2006

(30) Foreign Application Priority Data

Mar. 25, 2005 (JP) ............................. 2005-087873

(51) Int. Cl.
*G01V 3/00* (2006.01)
*G01N 27/72* (2006.01)
*G01R 33/12* (2006.01)

(52) U.S. Cl. ...................................... 324/345; 324/228
(58) Field of Classification Search ............... 324/345, 324/356, 228, 234, 239; 702/2, 7, 14; 335/296, 335/299
See application file for complete search history.

(56) References Cited

U.S. PATENT DOCUMENTS 5,568,053 A * 10/1996 Drubetsky et al. .......... 324/463
6,201,396 B1    3/2001 Matsuo et al.

* cited by examiner

*Primary Examiner*—Reena Aurora
*Assistant Examiner*—Kenneth J Whittington
(74) *Attorney, Agent, or Firm*—Jordan and Hamburg LLP

(57) ABSTRACT

A geo-storm generation apparatus includes a pair of coils disposed on a common center line with a predetermined interval, an electrode that is disposed between the pair of coils, an excitation power supply that excites the pair of coils such that magnetic fields with the same polarity are generated at facing ends of the pair of coils, and a control power supply that applies a control voltage to the electrode, wherein a geo-storm is generated between the pair of coils by concurrently driving the pair of coils with the excitation power supply.

5 Claims, 2 Drawing Sheets

GEO-STORM GENERATION APPARATUS AND INTERNAL EXPLORATION APPARATUS USING THE GEO-STORM GENERATION APPARATUS

CROSS-NOTING PARAGRAPH

This non-provisional application claims priority under 35 U.S.C. §119(a) on Patent Application No. 2005-087873 filed in JAPAN on Mar. 25, 2005, the entire contents of which are hereby incorporated herein by reference.

FIELD OF THE INVENTION

The present invention relates to a geo-storm generation apparatus that can generate a geo-storm artificially and an internal exploration apparatus that can use the geo-storm generation apparatus to observe an internal structure of an object.

BACKGROUND OF THE INVENTION

The applicant found earlier that geo-storm is observed when plates are pressed against each other before an earthquake occurs and proposed to predict the crustal movement of the earth (generally, an earthquake) by detecting and displaying the geo-storm (e.g., see U.S. Pat. No. 6,201,396 B1). However, the true nature of the geo-storm was not sufficiently found out at the time and an earthquake was predicted by detecting the phenomenon. Since the true nature of the geo-storm is found out at this time, the true nature of the geo-storm is revealed herein and an apparatus is proposed for generating the geo-storm artificially and utilizing the generated geo-storm effectively.

FIG. 1 is a diagram for describing the clarified true nature of the geo-storm and in FIG. 1, numerals 1 and 2 are permanent magnets and the permanent magnets 1, 2 are arranged on a common axis line 0-0 with the same poles (e.g., N poles or S poles) facing each other. Numerals 1' and 2' are magnetic lines generated by the permanent magnets 1, 2, and the magnetic lines 1', 2' do not intersect even if the permanent magnets 1, 2 are located in close proximity to each other. Therefore, a space 3 without any magnet line is generated between the permanent magnets 1, 2.

The smaller an interval L between the magnets 1, 2 is, the smaller the space 3 becomes and the larger the interval L is, the larger the space 3 becomes, and if the space 3 becomes large, two single permanent magnets simply exist, that is, the space 3 is almost vanished, which creates no problem.

This phenomenon is also generated when the permanent magnets 1, 2 are replaced with electromagnets, and two coils may be arranged oppositely with the centers thereof aligned with the common axis line 0-0 and currents may be applied to the coils such that magnetic fields with the same polarity are generated at the facing ends. In this way, by using magnet coils, the space 3 can be easily generated and vanished.

Although ores in the crust are composed of a multiplicity of single magnets and approximately half of the magnets form negative magnetic fields where same poles face to each other, the facing magnetic poles are typically separated by some distances and the aforementioned geo-storm is not generated. However, before an earthquake occurs, the crust is compressed and the facing magnetic poles approach to each other, resulting in the geo-storm. Since the crustal movement (localized compression and extension) before an earthquake causes the geo-storm to be generated and vanished, the occurrence of an earthquake can be predicted by detecting the geo-storm. Although the occurrence of an earthquake was predicted by detecting the aforementioned geo-storm in the invention described in U.S. Pat. No. 6,201,396 B1 proposed earlier by the applicant, the true nature of the geo-storm was not sufficiently found out at the time of the application of U.S. Pat. No. 6,201,396 B1, as described above.

SUMMARY OF THE INVENTION

As described above, in the present invention, since the true nature of the geo-storm has been found out, the geo-storm can be generated artificially and the inside of an object can be explored with the use of the geo-storm.

An object of the present invention is to provide a geo-storm generation apparatus comprising a pair of coils that is disposed on a common center line with a predetermined interval, an electrode that is disposed between the pair of coils, an excitation power supply that excites the pair of coils such that magnetic fields with the same polarity are generated at facing ends of the pair of coils, and a control power supply that applies a control voltage to the electrode, wherein a geo-storm is generated between the pair of coils by concurrently driving the pair of coils with the excitation power supply.

Another object of the present invention is to provide the geo-storm generation apparatus comprising a pair of bias magnets sandwiching the pair of coils on the center line at the outer sides of the pair of coils, wherein the magnetic poles at the facing surfaces of the bias magnets are the same as the magnetic poles generated at the facing surfaces of the pair of coils.

Another object of the present invention is to provide the geo-storm generation apparatus, wherein the pair of coils is driven continuously by a pulsed voltage to generate the geo-storm continuously.

Another object of the present invention is to provide the geo-storm generation apparatus, wherein the control electrode is controlled in synchronization with the pulsed voltage.

Another object of the present invention is to provide an internal exploration apparatus that uses the geo-storm generation apparatus, wherein the internal exploration apparatus radiates the geo-storm generated by the geo-storm generation apparatus to an examined object to detect the geo-storm transmitted through the examined object or the geo-storm reflected by the examined object such that an internal structure of the examined object is explored.

PREFERRED EMBODIMENTS OF THE INVENTION

Figure 1:
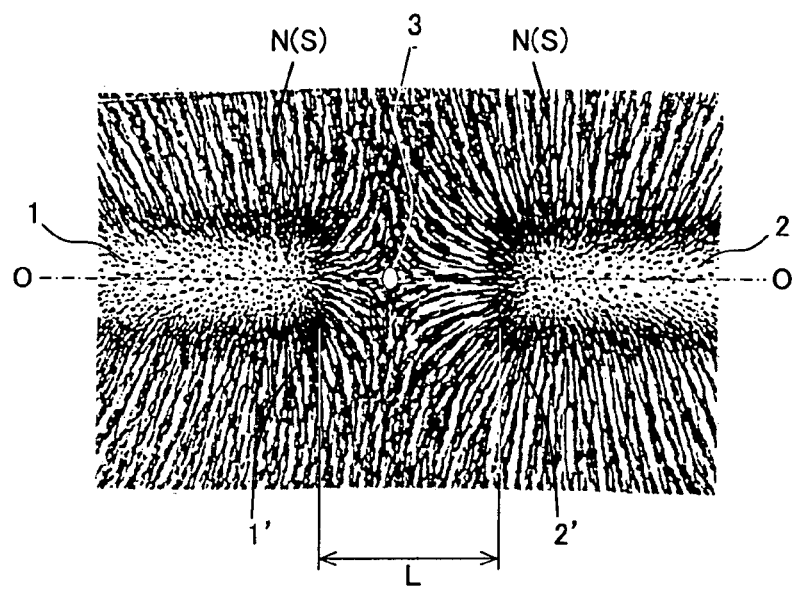
FIG. 1 is a diagram for describing the true nature of the geo-storm.
Figure 2:
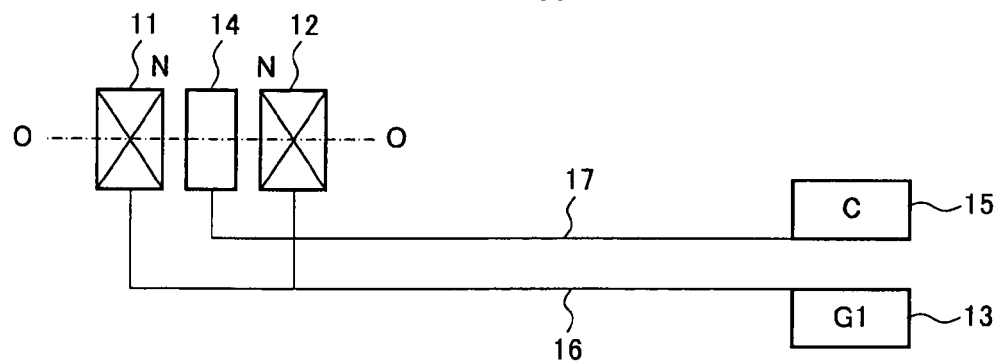
FIG. 2 is a configuration diagram of relevant portions for describing an embodiment of a geo-storm generation apparatus according to the present invention.

FIG. 2 is a configuration diagram of relevant portions for describing an embodiment of a geo-storm generation apparatus according to the present invention; in FIG. 2, numerals 11 and 12 are a pair of coils disposed on a common axis line 0-0 with a predetermined interval; and the pair of coils 11 and 12 is excited by an excitation power supply 13 through a control line 16 such that magnetic fields with the same polarity are generated at the facing ends (N poles in the shown example). Although a geo-storm 3 shown in FIG. 1 is generated at the middle point of a pair of the coils 11, 12 as described above when the coils 11, 12 are excited, the greater the currents applied to the coils 11, 12, i.e., the more intense the magnetic fields generated by the coils 11, 12 are, the smaller the geo-storm (space) 3 becomes and the more the energy is accumulated in the space 3, and if the currents applied to the coils 11, 12 are disconnected, i.e., if the magnetic fields are vanished, the space 3 disappears. Therefore, if the currents are applied to the coils 11, 12 intermittently (i.e., if pulse currents are applied) from the excitation power supply 13, the geo-storm 3 is generated and vanished at the middle region between the coils 11, 12 and the geo-storm is sequentially generated in a pulsed manner.

In FIG. 2, a numeral 14 is an electrode that controls the geo-storm generated as described above; a numeral 15 is a geo-storm control voltage regulator that regulates the voltage applied to the electrode 14; for example, the electrode 14 is an aluminum plate or entirely copper plate with fine pores punched out in a reticular pattern, which is disposed around the region generating the geo-storm such that the geo-storm is surrounded; and the generated geo-storm is controlled by the electric potential applied to the electrode 14 through the control line 17 from the geo-storm control voltage regulator 15 to generate an outgoing geo-storm suitable for the intended use. When the geo-storm control voltage is applied to the electrode 14 in synchronization with the generation of the pulsed voltage of the excitation power supply 13 to synchronize the generation of the geo-storm with the voltage applied to the electrode 14, the geo-storm can be generated and controlled more effectively.

Figure 3:
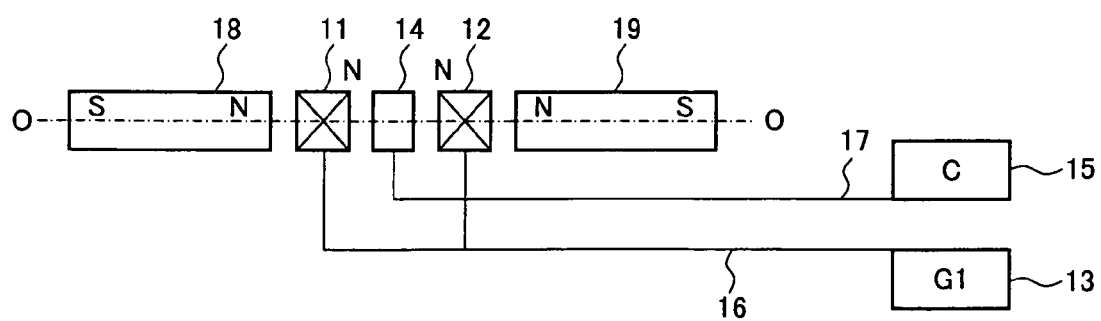
FIG. 3 is a diagram for describing another embodiment of the geo-storm generation apparatus according to the present invention.

FIG. 3 is a diagram for describing another embodiment of the geo-storm generation apparatus according to the present invention; in FIG. 3, numerals 18 and 19 are bias magnets; and although permanent magnets are used as the bias magnets in the shown example, electromagnets may be used instead of the permanent magnets. The bias magnets 18, 19 are located at the outer sides of the coils 11, 12 for generating the geo-storm on the same axis line 0-0 in common with the coils 11, 12, and are disposed such that the facing ends have the same magnetic poles as those of the magnets generated at the facing ends of the coils 11, 12. In this way, since the geo-storm is preliminarily created to some degree by the bias magnets 18, 19, the pulsed currents applied to the coil pair 11, 12 can be decreased, which makes the generation of the geo-storm easier.

Figure 4:
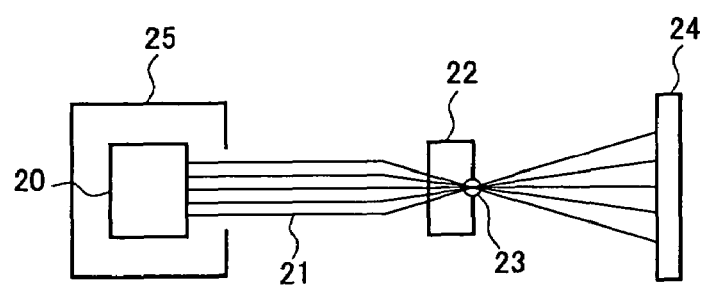
FIG. 4 is a configuration diagram of relevant portions for describing an example of an object exploration apparatus that can observe a shape, internal structure, etc. of an object with the use of the geo-storm generation apparatus according to the present invention.

FIG. 4 is a configuration diagram of relevant portions for describing an example of an object exploration apparatus that can observe a shape, internal structure, etc. of an object with the use of the aforementioned geo-storm generation apparatus according to the present invention; in FIG. 4, a numeral 20 is the aforementioned geo-storm generation apparatus according to the present invention; a numeral 21 is a flow of the geo-storm radiated from the geo-storm generation apparatus 20; a numeral 22 is a focusing device that radiates an object 23 with the geo-storm focused by, for example, refraction through a few combined copper rings, each of which is applied with different electric potential to control the flow of the geo-storm; a numeral 24 is a display that detects and displays an image of the object 23 in response to the geo-storm passing through the object 23. The display 24 is composed of three coils disposed on the same common axis line; the two coils at both ends create the geo-storm situation; and the center coil detects the geo-storm. Unlike detection of the geo-storm in the natural world, the two coils create the geo-storm in accordance with a certain rule, and the level increased in accordance with the rule is utilized.

When the geo-storm is applied to an object (material), the geo-storm has the predisposition to be reflected, refracted, attenuated, or transmitted (to pass through) depending on the material and, therefore, the flow of the geo-storm can be refracted and focused as described above as well as can be transmitted through and reflected by the object such that the internal structure of the object can be observed by using this disposition.

In FIG. 4, the image displayed on the display 24 may be an image when the geo-storm is transmitted through the material 23 or an image when the geo-storm is reflected by the material 23.

Figure 5:
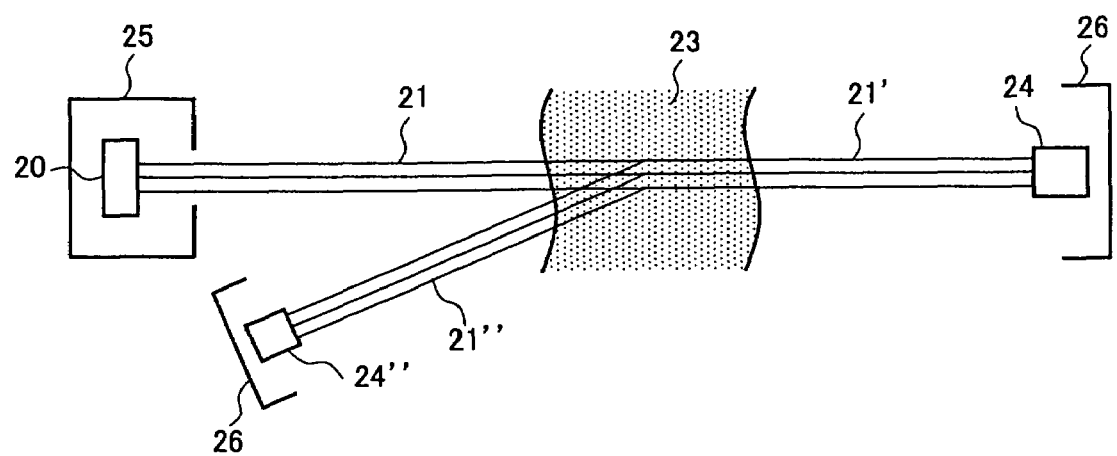
FIG. 5 is a diagram for describing an example when an internal structure of a relatively large object is observed.

FIG. 5 is a diagram for describing an example when an internal structure of the relatively large object 23 is observed; in the example of FIG. 5, the geo-storm flow 21 radiated from the geo-storm generation apparatus 20 is directly radiated to the object 23; a geo-storm flow 21' transmitted through the object 23 is detected by a detector 24'; and a geo-storm flow 21" reflected by the object 23 is detected by a detector 24". As described above, since the geo-storm generation apparatus of the present invention can control the radiation direction, etc. of the geo-storm with the structure of the control electrode 14 and the control voltage applied to the control electrode 14, the internal structure of the object can be observed while the geo-storm radiated to the object 23 is swept by moving the detectors 24', 24" in accordance with the regulation of the voltage regulator 15, for example. The object 23 can be the crust, and in this case, since the detector 24' cannot be disposed at the backside of the crust 23, the detector 24' is not used in the case of such crust exploration. A numeral 25 is a ground shield plate constituted by a copper plate or an aluminum plate with fine pores punched out and a numeral 26 is an antenna constituted by an aluminum plate or a copper plate with fine pores punched out, which is applied with the electric potential used for the focusing device 22.

According to the present invention, advantages can be obtained as follows.

According to the present invention, a geo-storm can be generated artificially and, for example, an internal structure of an object can be observed with the use of the generated geo-storm.

The invention claimed is:

1. An internal exploration apparatus that uses a geo-storm generation apparatus which comprises a pair of coils being disposed on a common center line with a predetermined interval, an electrode being disposed between the pair of coils, an excitation power supply that excites the pair of coils such that magnetic fields with the same polarity are generated at facing ends of the pair of coils and a control power supply that applies a control voltage to the electrode such that a geo-storm is generated between the pair of coils by concurrently driving the pair of coils with the excitation power supply, wherein the internal exploration apparatus radiates the geo-storm generated by the geo-storm generation apparatus to an examined object to detect the geo-storm transmitted through the examined object or the geo-storm reflected by the examined object such that an internal structure of the examined object is explored.

2. A geo-storm generation apparatus, comprising:
a pair of coils being disposed on a common center line with a predetermined interval;
an electrode being disposed between the pair of coils;
an excitation power supply that excites the pair of coils such that magnetic fields with the same polarity are generated at facing ends of the pair of coils;
a control power supply that applies a control voltage to the electrode such that a geo-storm is generated between the pair of coils by concurrently driving the pair of coils with the excitation power supply; and
a pair of bias magnets sandwiching the pair of coils on the center line at the outer sides of the pair of coils, wherein the magnetic poles at the facing surfaces of the bias magnets are the same as the magnetic poles generated at the facing surfaces of the pair of coils.

3. A geo-storm generation apparatus comprising:
a pair of coils being disposed on a common center line with a predetermined interval;
an electrode being disposed between the pair of coils;
an excitation power supply that excites the pair of coils such that magnetic fields with the same polarity are generated at facing ends of the pair of coils;
a control power supply that applies a control voltage to the electrode such that a geo-storm is generated between the pair of coils by concurrently driving the pair of coils with the excitation power supply, wherein the pair of coils is driven continuously by a pulsed voltage to generate the geo-storm continuously.

4. The geo-storm generation apparatus of claim 3, wherein the control electrode is controlled in synchronization with the pulsed voltage.

5. An internal exploration apparatus that uses the geo-storm generation apparatus of any one of claims 2 to 4, wherein the internal exploration apparatus radiates the geo-storm generated by the geo-storm generation apparatus to an examined object to detect the geo-storm transmitted through the examined object or the geo-storm reflected by the examined object such that an internal structure of the examined object is explored.

* * * * *